United States Patent [19]
Strazar

[11] Patent Number: 5,499,430
[45] Date of Patent: Mar. 19, 1996

[54] HOSE CLAMP WITH SUPPLEMENTAL HOLDING FINGERS

[76] Inventor: Andrew A. Strazar, R.R. 1 Box 9B, Nokomis, Ill. 62075

[21] Appl. No.: 288,016

[22] Filed: Aug. 10, 1994

[51] Int. Cl.⁶ .................................................. F16L 33/04
[52] U.S. Cl. ................................................. 24/279; 24/19
[58] Field of Search ................ 285/23, 253; 24/20 R, 24/19, 20 LS, 274 R, 274 P, 274 WB, 279–283

[56] References Cited

U.S. PATENT DOCUMENTS

| | | | |
|---|---|---|---|
| 1,532,596 | 4/1925 | Madsen | 285/253 X |
| 3,010,172 | 11/1961 | Kaplan | 24/279 |
| 3,564,676 | 2/1971 | Oeser | 24/279 |
| 5,309,607 | 5/1994 | Hohmann et al. | 24/274 R |

FOREIGN PATENT DOCUMENTS 373678  6/1932  United Kingdom ...................... 24/279

*Primary Examiner*—James R. Brittain

[57] ABSTRACT

A hose clamp with supplemental holding fingers comprising: a worm drive clamp of a resilient material positionable in a loop about the free end of a hose to be clamped to an interior cylindrical member, the clamp having one free end with recesses for use with a worm in tightening the clamp; a tightening member having a radially interior end secured to the interior face of the clamp adjacent to the recesses with a hollow tubular member radially outward thereof, the tubular member having internal threads with a threaded rotatable member interior thereof, the rotatable member having a component at one end for rotation thereof whereby the threads of the rotatable member function to cooperate with the recesses of the clamp for movement thereof to tighten or loosen the clamp; and a pair of generally V-shaped fingers each with a flat central section secured to the interior surface of the clamp at diametrically opposed points, each of the fingers extending at obtuse angles from the central section in opposite directions for applying an initial holding force between the clamp and the tube to be clamped while the rotatable member is rotated in one direction or another to tighten or loosen the clamp.

3 Claims, 4 Drawing Sheets

HOSE CLAMP WITH SUPPLEMENTAL HOLDING FINGERS

BACKGROUND OF THE INVENTION

1. Field of the Invention

The present invention relates to a new and improved hose clamp with supplemental holding fingers and, more particularly, pertains to holding a hose clamp in position on a hose through the use of V-shaped springs located interior of the clamp.

2. Description of the Prior Art

The use of clamping devices including hose clamps of a wide variety of designs and configurations is known in the prior art. More specifically, clamping devices including hose clamps of a wide variety of designs and configurations heretofore devised and utilized for the purpose of clamping together tubular components through a wide variety of apparatuses and methods are known to consist basically of familiar, expected, and obvious structural configurations, notwithstanding the myriad of designs encompassed by the crowded prior art which has been developed for the fulfillment of countless objectives and requirements.

The prior art discloses a large number of clamping devices including hose clamps of a wide variety of designs and configurations. By way of example, U.S. Pat. No. 3,805,337 to Branstetter discloses a spring wire hose clamp.

U.S. Pat. No. 4,697,501 to Hupf discloses a stiffening spring hose clamp.

U.S. Pat. No. 5,050,275 to Schroer discloses a hose clamp.

U.S. Pat. No. 5,111,555 to Oetiker discloses a high strength clamp structure.

Lastly, U.S. Pat. No. 5,185,907 to Kawashima discloses a hose clamp assembly.

In this respect, the hose clamp with supplemental holding fingers according to the present invention substantially departs from the conventional concepts and designs of the prior art, and in doing so provides an apparatus primarily developed for the purpose of holding a hose clamp in position on a hose through the use of V-shaped springs located interior of the clamp.

Therefore, it can be appreciated that there exists a continuing need for a new and improved hose clamp with supplemental holding fingers which can be used for holding a hose clamp in position on a hose through the use of V-shaped springs located interior of the clamp. In this regard, the present invention substantially fulfills this need.

SUMMARY OF THE INVENTION

In view of the foregoing disadvantages inherent in the known types of clamping devices including hose clamps of a wide variety of designs and configurations now present in the prior art, the present invention provides a new and improved hose clamp with supplemental holding fingers. As such, the general purpose of the present invention, which will be described subsequently in greater detail, is to provide a new and improved hose clamp with supplemental holding fingers and methods which have all the advantages of the prior art and none of the disadvantages.

To attain this, the present invention essentially comprises a new and improved hose clamp with supplemental holding fingers comprising, in combination: a worm drive clamp of a resilient material positionable in a loop about the free end of a hose to be clamped to an interior cylindrical member, the clamp having one free end with recesses for use with a worm in tightening the clamp; a tightening member having a radially interior end secured to the interior face of the clamp adjacent to the recesses with a hollow tubular member radially outward thereof, the tubular member having internal threads with a threaded rotatable member interior thereof, the rotatable member having a hex head and screwdriver slot at one end for rotation thereof whereby the threads of the rotatable member function to cooperate with the recesses of the clamp for movement thereof to tighten or loosen the clamp; and a pair of generally V-shaped fingers each with a flat central section secured to the interior surface of the clamp at diametrically opposed points, the height of the fingers being essentially the same as the height of the clamp, each of the fingers extending at obtuse angles at about 135 degrees, plus or minus ten percent, from the central section in opposite directions for applying an initial holding force between the clamp and the tube to be clamped while the rotatable member is rotated in one direction or another to tighten or loosen the clamp.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hose clamp with supplemental holding fingers which has all the advantages of the prior art clamping devices including hose clamps of a wide variety of designs and configurations and none of the disadvantages.

It is another object of the present invention to provide a new and improved hose clamp with supplemental holding fingers which may be easily and efficiently manufactured and marketed.

It is a further object of the present invention to provide a new and improved hose clamp with supplemental holding fingers which is of a durable and reliable construction.

An even further object of the present invention is to provide a new and improved hose clamp with supplemental holding fingers which is susceptible of a low cost of manufacture with regard to both materials and labor, and which accordingly is then susceptible of low prices of sale to the consuming public, thereby making such a hose clamp with supplemental holding fingers economically available to the buying public.

Still yet another object of the present invention is to provide a new and improved hose clamp with supplemental holding fingers which provides in the apparatuses and methods of the prior art some of the advantages thereof, while simultaneously overcoming some of the disadvantages normally associated therewith.

Even still another object of the present invention is to hold a hose clamp in position on a hose through the use of V-shaped springs located interior of the clamp.

Lastly, it is an object of the present invention to provide a hose clamp with supplemental holding fingers comprising: a worm drive clamp of a resilient material positionable in a loop about the free end of a hose to be clamped to an interior cylindrical member, the clamp having one free end with recesses for use with a worm in tightening the clamp; a tightening member having a radially interior end secured to the interior face of the clamp adjacent to the recesses with a hollow tubular member radially outward thereof, the tubular member having internal threads with a threaded rotatable member interior thereof, the rotatable member having a component at one end for rotation thereof whereby the threads of the rotatable member function to cooperate with the recesses of the clamp for movement thereof to tighten or loosen the clamp; and a pair of generally V-shaped fingers each with a flat central section secured to the interior surface of the clamp at diametrically opposed points, each of the fingers extending at obtuse angles from the central section in opposite directions for applying an initial holding force between the clamp and the tube to be clamped while the rotatable member is rotated in one direction or another to tighten or loosen the clamp.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various FIGURES.

DESCRIPTION OF THE PREFERRED EMBODIMENT

Figure 1:
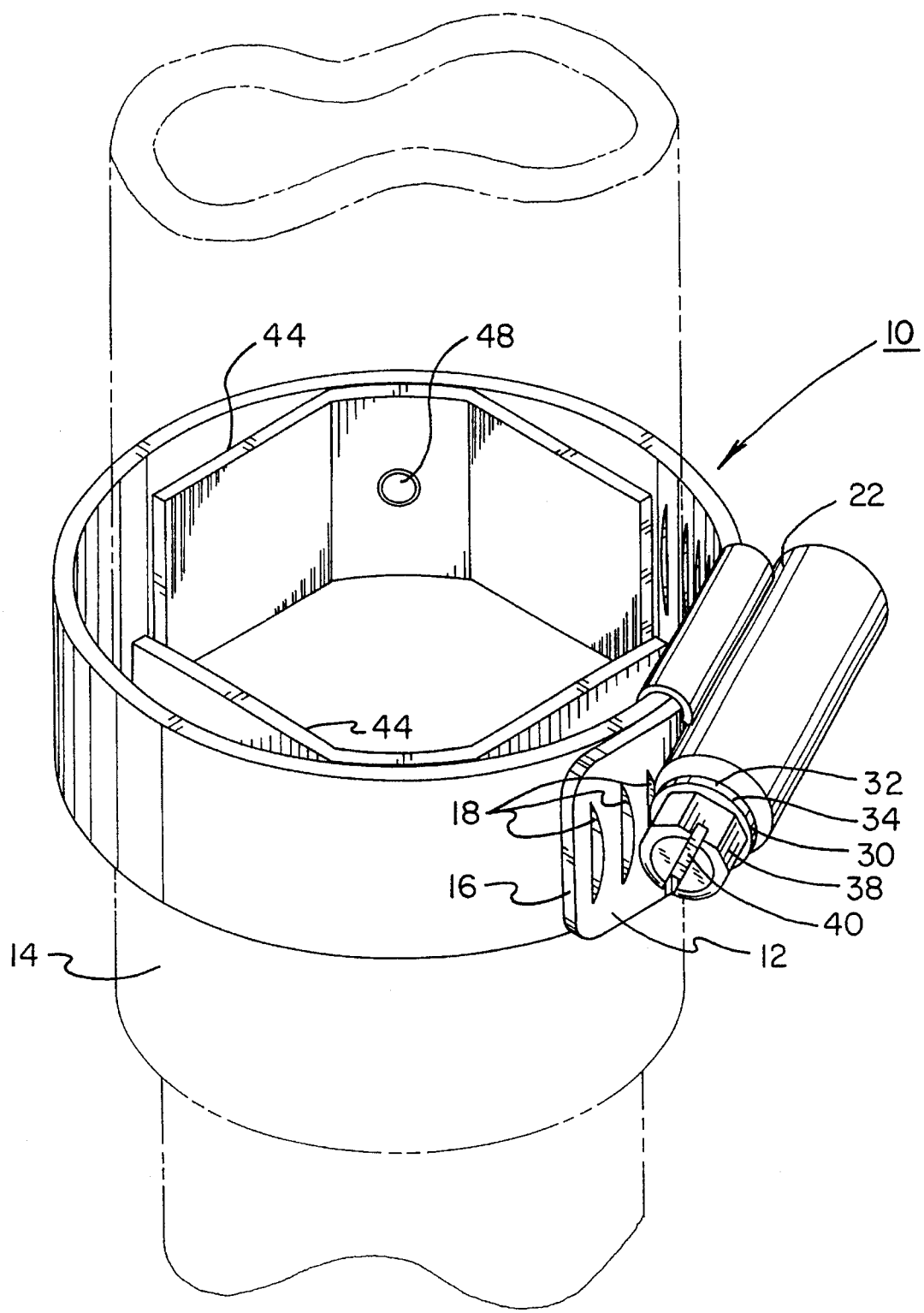
FIG. 1 is an enlarged perspective view of the preferred embodiment of the new and improved hose clamp with supplemental holding fingers constructed in accordance with the principles of the present invention.
Figure 2:
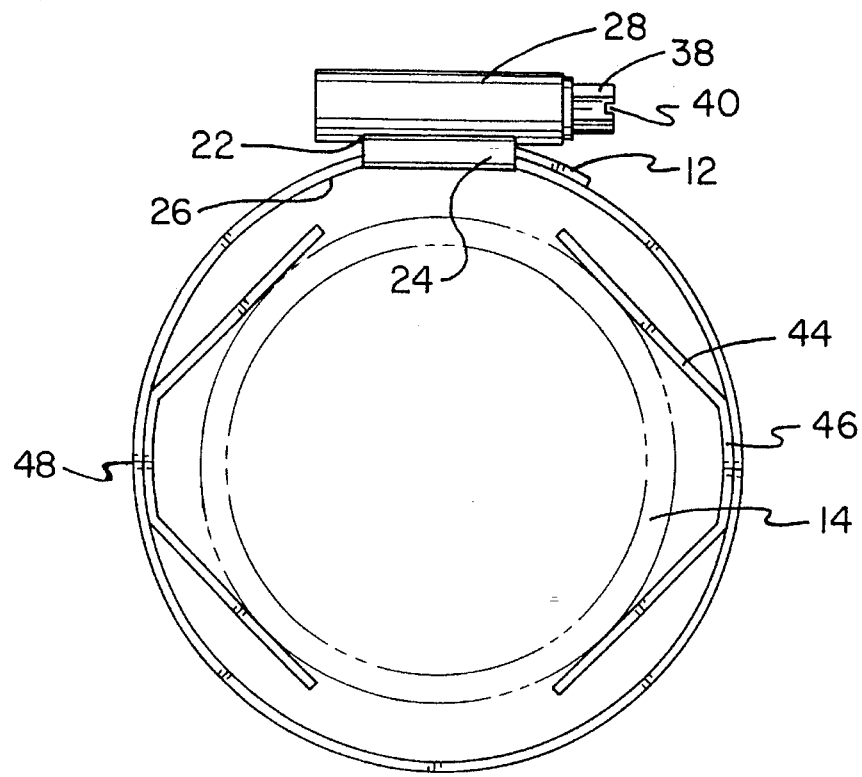
FIG. 2 is a top elevational view of the device shown in FIG. 1 with a hose being secured prior to clamping.
Figure 3:
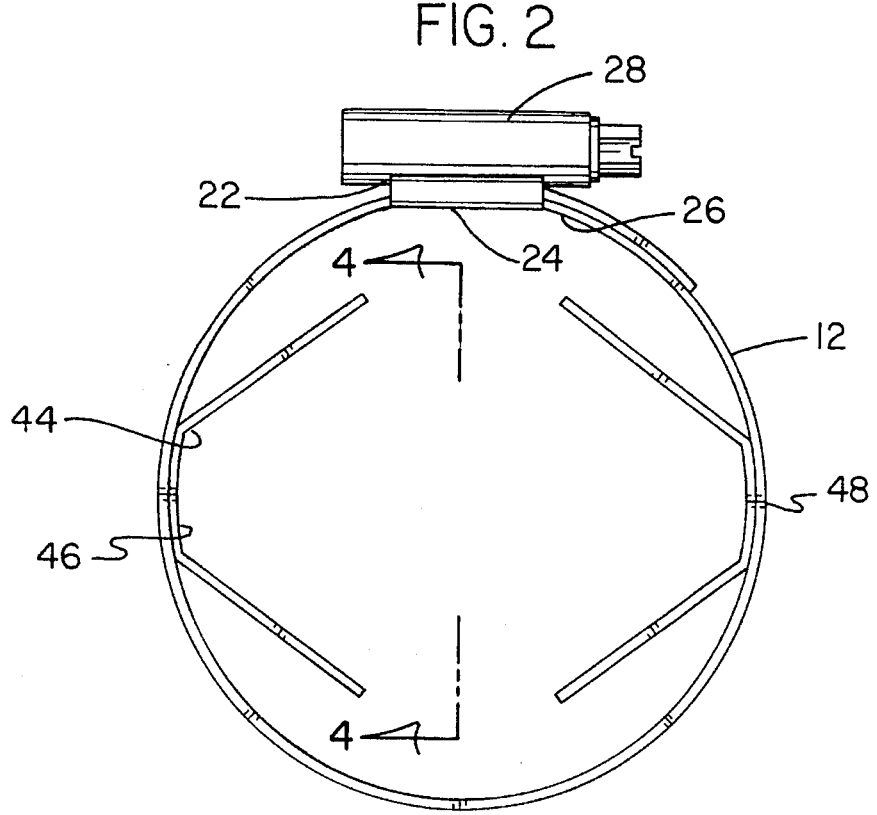
FIG. 3 is a top elevational view similar to FIG. 2 but with the hose removed.
Figure 4:
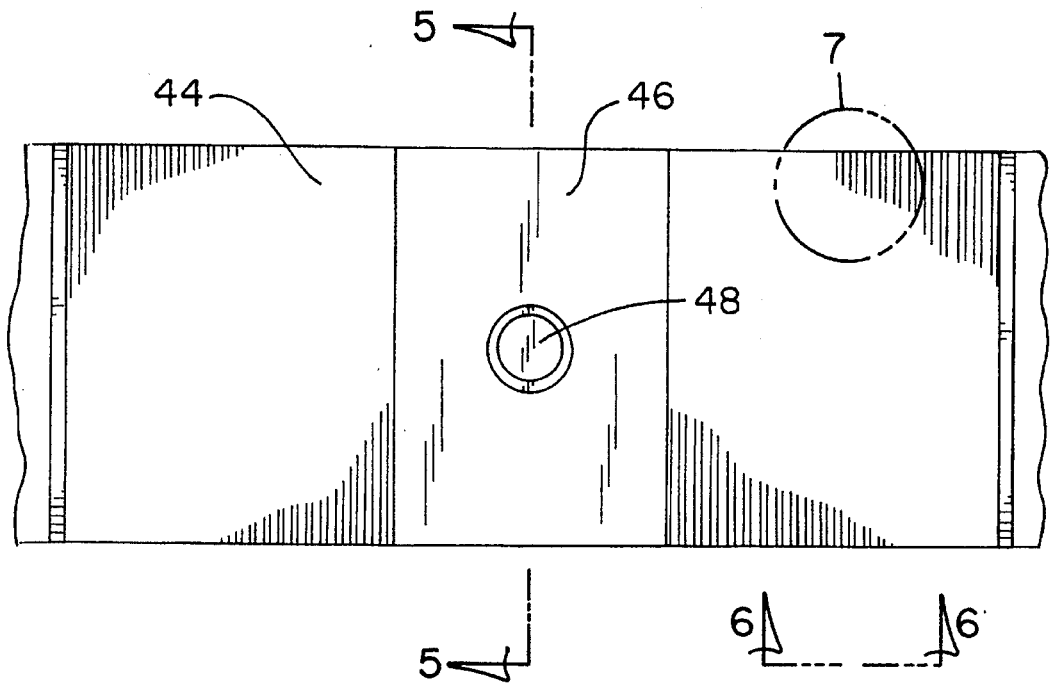
FIG. 4 is a side elevational view of the device shown in the prior FIGURE.
Figure 5:
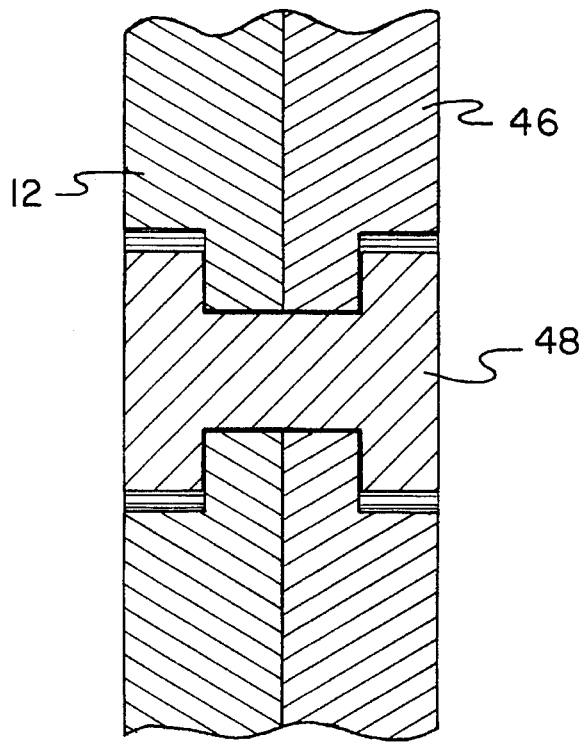
FIG. 5 is a cross-sectional view taken along line 5—5 of FIG. 4.
Figure 6:
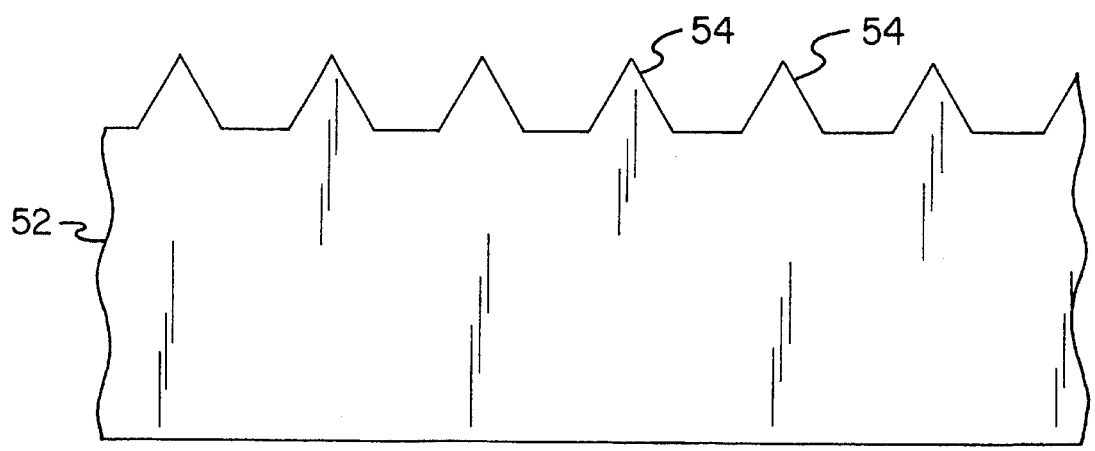
FIG. 6 is an end elevational view taken along line 6—6 of FIG. 4.
Figure 7:
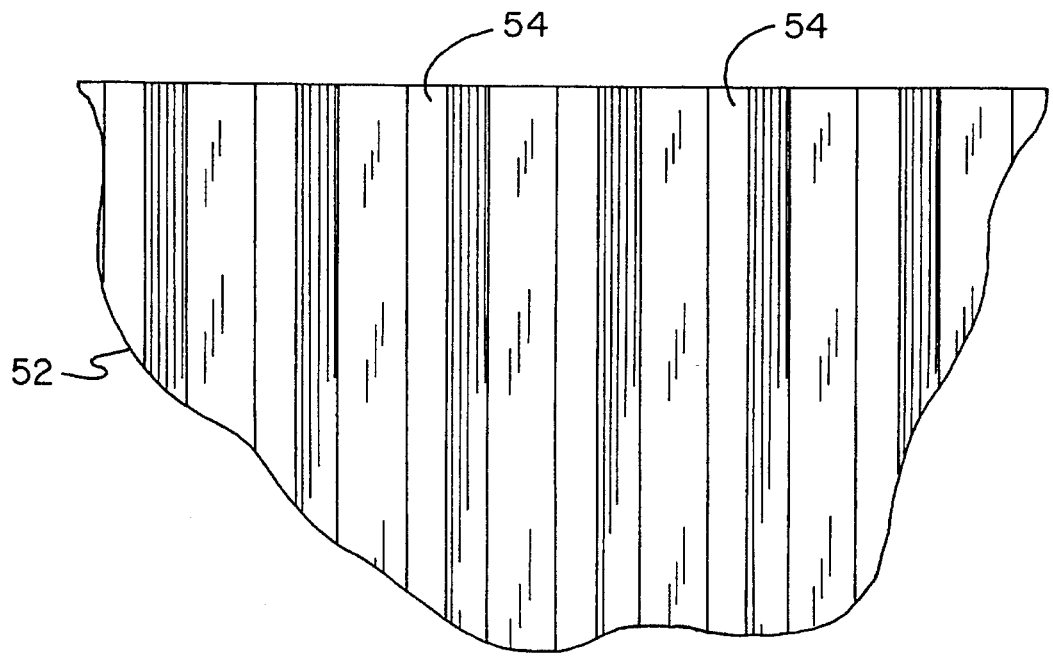
FIG. 7 is an enlarged front elevational view taken about circle 7 of FIG. 5.

With reference now to the drawings, and in particular to FIG. 1 thereof, the preferred embodiment of the new and improved hose clamp with supplemental holding fingers embodying the principles and concepts of the present invention and generally designated by the reference numeral 10 will be described.

The present invention, the new and improved hose clamp with supplemental holding fingers is a system comprised of a plurality of components. The components in their broadest context include a clamp, a tightening member, and fingers. Each of the individual components is specifically configured and correlated one with respect to the other to attain the desired objectives.

The central component of the system 10 of the present invention is a worm drive clamp 12. The clamp is of a resilient flexible material. It is positionable in a loop shape configuration around the free end of a hose 14 to be clamped to an interior cylindrical member. The clamp has free ends 16 with recesses 18. Such recesses are for use with a worm in tightening the clamp.

The next component of the system is the tightening member 22. Such tightening member has its radially interior end 24 secured to the interior face 26 of the clamp. Such securement is adjacent to the recesses. The tightening member also has a hollow tubular member 28. Such tubular member is radially outward of the region of securement. The tubular member has internal threads 30. In addition, a rotatable member 32 with threads 34 is located interior of the tubular member.

The rotatable member is preferably formed with an adjusting component in the nature of a hex head 38 and/or a screwdriver slot 40 at one end. Such is to effect rotation of the rotatable member. In this manner, the threads of the rotatable member can function to contact and cooperate with the recesses of the clamp. This effects movement of the clamp to tighten or loosen the clamp depending on the direction of rotation.

The next component of the system 10 is a pair of generally V-shaped fingers or spring clips 44. Each of the fingers is provided with a flat central section 46. Such section is secured to the interior surface of the clamp as through a rivet 48. Coupling of each of the V-shaped fingers is at diametrically opposed points or essentially diametrically opposed points around the circumference of the clamp.

The height of the fingers is essentially the same as the height of the clamp. Note FIG. 1. Each of the fingers 52 also extends outwardly at an obtuse angle of about 135 degrees, plus or minus ten percent, in the nature of about 125 to about 145 degrees. Such measurement is made with respect to the central section of the fingers. Such angles are in opposite directions from each other. The fingers, being resilient and flexible, are for applying an initial holding force between the clamp and the tube to be clamped during the time when the rotatable member is rotated in one direction or another to effect the tightening or loosening of the clamp. Teeth 54 on the fingers ensure greater securement to the hose.

The preferred materials for the clamp are plastic or metal of sufficient thicknesses to allow limited flexibility and resilience. Similarly, the preferred material for the fingers is a flexible, resilient material as, for example, plastic or metal.

The present invention is easier to apply because it has spring clips to hold it in place while it is being tightened. Usually two hands are required for attaching a clamp on the hose. One holds it in position, while the other hand tightens it on the hose. The clamps embodied in this invention are of the type which are tightened by turning a screw. The most common of these has a threaded worm which rotates in helically inclined slots in a metal band to tighten it around the hose.

When replacing hoses on motor vehicles, the necessity of using two hands to apply the clamp often creates a problem because of the confined working area. With such accessories as power windows, doors, and seats, as well as air conditioning and fuel injection, the engine compartments are usually crammed full. In some cases using a second hand to hold the clamp is almost impossible.

The present invention can be installed and tightened by using only one hand to turn the worm. This is made possible by provided V-shaped spring steel supports on the inside of the clamp. They are opposite each other and centralize the clamp on the hose, applying enough force to prevent it from slipping down when it is not supported by hand. Using only one hand, the worm is turned to close the band tightly around the hose. When the clamp is loosened, the springs also prevent it from dropping down to where it may be difficult to retrieve.

Existing clamps are made in several sizes, in steel and stainless steel. All can include this very convenient feature.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved hose clamp with supplemental holding fingers comprising, in combination:

a worm drive clamp of a resilient material positionable in a loop about the free end of a hose to be clamped to an interior cylindrical member, the clamp having one free end with recesses for use with a worm in tightening the clamp;

a tightening member having a radially interior end secured to the interior face of the clamp adjacent to the recesses with a hollow tubular member radially outward thereof, the tubular member having internal threads with a threaded rotatable member interior thereof, the rotatable member having a hex head and screwdriver slot at one end for rotation thereof whereby the threads of the rotatable member function to cooperate with the recesses of the clamp for movement thereof to tighten or loosen the clamp;

a pair of generally V-shaped fingers each with a flat central section having a rivet to form a pair of spring clips interior the clamp, the rivet securing each V-shaped finger to the interior surface of the clamp at diametrically opposed points, the height of the fingers being essentially the same as the height of the clamp, each of the fingers extending at obtuse angles at about 135 degrees, plus or minus ten percent, from the central section in opposite directions for applying an initial holding force between the clamp and the tube to be clamped while the rotatable member is rotated in one direction or another to tighten or loosen the clamp; and the spring clips, each of which have teeth thereon for greater grasping of the tube to be clamped, the spring clips hold the tube within the clamp while the rotatable member is turned with one hand, the hand turning the rotatable member securing the worm clamp around the free end of the hose with the one free end of the hose being held in position by the spring clips.

2. The apparatus as set forth in claim 1 wherein the fingers are metal.

3. The apparatus as set forth in claim 1 wherein the fingers are plastic.

\* \* \* \* \*